F. CORSA.
AXLE-LUBRICATOR.

No. 184,344. Patented Nov. 14, 1876.

Witnesses.
Otto Ahpland.
Robt E. Miller

Inventor
Frank Corsa
by
Van Santvoord & Hauff
his attorneys

UNITED STATES PATENT OFFICE.

FRANK CORSA, OF BROOKLYN, NEW YORK.

IMPROVEMENT IN AXLE-LUBRICATORS.

Specification forming part of Letters Patent No. 184,344, dated November 14, 1876; application filed October 4, 1876.

*To all whom it may concern:*

Be it known that I, FRANK CORSA, of Brooklyn, in the county of Kings and State of New York, have invented a new and useful Improvement in Lubricating-Axles, which improvement is fully set forth in the following specification, reference being had to the accompanying drawing, in which—

Figure 1:
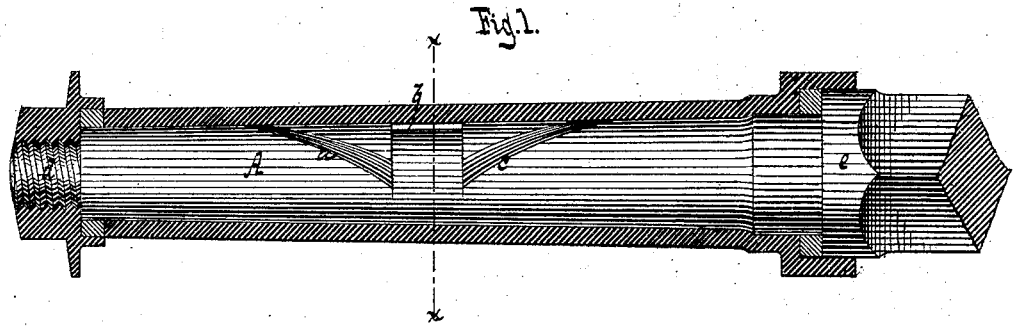
Figure 2:
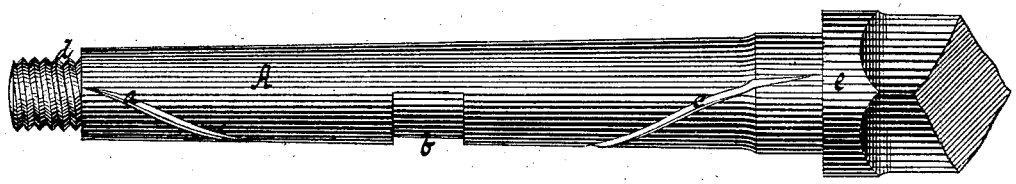
Figure 3:
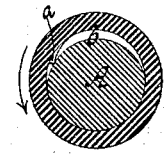

Figure 1 represents a side view of my improvement, partly in section. Fig. 2 is a like view, looking in a different direction. Fig. 3 is a cross-section in the plane $x\,x$, Fig. 1.

Similar letters indicate corresponding parts.

My improvement relates to lubricating-axles for vehicles; and consists in the combination of a central recess and two spiral grooves extending from said central recess in reverse directions, and which terminate, respectively, before reaching the collar and nib of the axle-arm, so that the oil or other lubricating material applied to said axle-arm is taken up by said spiral grooves when a wheel is placed on the arm and a revolving motion is given thereto, and thereby said lubricating material is conducted to the central recess, and is not liable to escape at the ends of the arm, as will be hereinafter more fully set forth.

In the drawing, the letter A designates an axle-arm, on the central portion of which is formed a recess, $b$, said recess extending crosswise of the axle and about half-way around it, as seen in Fig. 3. $a\,c$ are two spiral grooves emanating from said central recess $b$, and extending in reverse directions toward the ends of the axle-arm A, said grooves terminating before reaching the nib $d$ and collar $e$ formed at said ends of the arm.

When a wheel is placed on the axle-arm A and revolved, any oil or other lubricating material placed at or near the nib $d$ thereof is taken up by the spiral groove $a$ and conducted to the central recess $b$, whence it readily spreads over the thick portion of the arm. The surplus material, which collects at the thick end of the axle-arm or near the collar $e$, is carried back to the central recess $b$ by the spiral groove $c$. By causing the spiral grooves $a$ and $c$ to terminate before reaching the collar $e$ and nib $d$ the lubricating material is prevented from reaching the extreme ends of the axle-arm A, and by this means it is effectually prevented from escaping at such points, as is the case in lubricating-axles now commonly used. I thus avoid loss or waste of material, and at the same time cause the axle to run a comparatively long time without re-oiling.

One edge of the spiral grooves $a\,c$ is preferably beveled while the other is made straight, as clearly shown in Fig. 3, so that if the whole is so arranged that the vehicle wheel revolves against the straight edges of the grooves, as indicated by the arrow in Fig. 3, the lubricating material is caught with the greatest possible facility.

What I claim as new, and desire to secure by Letters Patent, is—

In an axle-lubricator, the combination of the central depression $b$ in the axle, with the two spiral grooves $c\,c$ extending from the said central recess in reverse directions, and both vanishing in the axle before reaching the collar and nib of the same, as and for the object specified.

In testimony that I claim the foregoing I have hereunto set my hand and seal this 27th day of September, 1876.

FRANK CORSA. [L. S.]

Witnesses:
W. HAUFF,
E. F. KASTENHUBER.